(12) United States Patent
Zhang et al.

(10) Patent No.: US 8,345,610 B2
(45) Date of Patent: Jan. 1, 2013

(54) METHOD AND APPARATUS FOR MAPPING PILOT SIGNALS IN MULTIPLEXING MODE OF UNICAST AND BROADCAST/MULTICAST SERVICES

(75) Inventors: Bijun Zhang, Shanghai (CN); Yu Chen, Shanghai (CN); Zhongji Hu, Shanghai (CN); Yonggang Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 460 days.

(21) Appl. No.: 12/665,134

(22) PCT Filed: Jun. 18, 2007

(86) PCT No.: PCT/CN2007/001907
§ 371 (c)(1),
(2), (4) Date: Dec. 17, 2009

(87) PCT Pub. No.: WO2008/154768
PCT Pub. Date: Dec. 24, 2008

(65) Prior Publication Data
US 2010/0172282 A1    Jul. 8, 2010

(51) Int. Cl.
*H04W 4/00*    (2009.01)
*H04B 7/00*    (2006.01)

(52) U.S. Cl. ......................... 370/329; 455/500

(58) Field of Classification Search ............ None
See application file for complete search history.

(56) References Cited

U.S. PATENT DOCUMENTS

2007/0104151 A1    5/2007  Papasakellariou et al.
2008/0165871 A1*   7/2008  Kisoda et al. ............... 375/260
2009/0011767 A1*   1/2009  Malladi et al. .............. 455/450
2009/0060077 A1*   3/2009  Miyoshi et al. ............. 375/260
2009/0190516 A1*   7/2009  Fukuoka et al. ............ 370/312

FOREIGN PATENT DOCUMENTS

| CN | 1852069 A | 10/2006 |
| CN | 1972268 A | 5/2007 |
| WO | WO 2005/041515 | 5/2005 |
| WO | WO2005/122516 A1 | 12/2005 |

(Continued)

OTHER PUBLICATIONS

3GPP TSG-RAN WGl Meeting #47 R1-063367 Riga, Latvia, Nov. 6-10, 2006.*

(Continued)

*Primary Examiner* — Eunsook Choi
(74) *Attorney, Agent, or Firm* — Fay Sharpe LLP (57) ABSTRACT

Disclosed is a method for mapping pilot signals in a multiplexing mode of unicast service and Multimedia Broadcast/Multicast Service (MBMS). The method comprises the steps of: generating pilot symbols for the unicast service and the MBMS service, respectively; mapping the pilot symbols for the MBMS service to multiple transmit antennas such that, in a subframe, the pilot symbols for the MBMS service for each antenna are arranged in a same time domain and adjacent to each other, the pilot symbols for the MBMS service for the same transmit antenna are spaced from each other by a predetermined number of subcarriers in the frequency domain and by a predetermined number of OFDM symbols in the time domain, and the pilot symbols for the MBMS service for the same transmit antenna are arranged in a staggered form along the time domain, and mapping the pilot symbols for the unicast service at the same time.

27 Claims, 7 Drawing Sheets

FOREIGN PATENT DOCUMENTS

WO     WO2006/132589 A2    12/2006
WO     WO 2007/043477    *    4/2007

OTHER PUBLICATIONS

International Search Report.

European Search Report dated Jun. 12, 2012 for Appl. No. PCT/CN2007/001907.

Alcatel-Lucent, "Reference Signal Structure for Multi-antenna E-MBMS Transmission", 3GPP TSG RAN WG1 Meeting 47, vol. R1-070526, Sorrento, Italy, Jan. 9, 2007, pp. 1-6.

LG Electronics, "Multiplexing of MBMS and 1-21 unicast transmission in E-UTRA downlink", 3GPP TSG-RAN WG1 LTE Ad Hoc, vol. R1-060054, Jan. 1, 2006, pp. 1-5.

* cited by examiner

METHOD AND APPARATUS FOR MAPPING PILOT SIGNALS IN MULTIPLEXING MODE OF UNICAST AND BROADCAST/MULTICAST SERVICES

FIELD OF THE INVENTION

The present invention relates to a method and apparatus for mapping pilot signals in a multiplexing mode of unicast service and broadcast/multicast service, in particular to a method and apparatus for mapping pilot signals for unicast service and broadcast/multicast service in a multi-antenna system in a multiplexing mode of unicast service and broadcast/multicast service, which can provide pilot signals suitable for a multi-transmit-antenna system, improve data throughput and achieve a higher performance gain.

BACKGROUND OF THE INVENTION

The 3GPP ($3^{rd}$ Generation Partnership Project) launched LTE (Long Term Evolution) in 2005, which aims to provide support for increasing requirements from operators and subscribers with higher data throughput and better network performance.

MBMS (Multimedia Broadcast/Multicast Service) is introduced in 3GPP Rel. 6 as a one-to-more point service that transmits data from a single data source to multiple subscribers so as to share network (including core network and access network) resources and provide services for more multimedia subscribers having identical requirements with fewer resources. In a wireless access network, MBMS service can, by using public transmission channel and public wireless bearer, implement both pure-text, lower-rate multicast and broadcast of message type and higher-rate multicast and broadcast of multimedia services, such as mobile TV phone.

Currently, 3GPP has devised respective pilot signal mapping methods for unicast service and broadcast/multicast service with a single antenna, i.e., methods for transmitting pilot signals via a single antenna.

LTE recommends support for enhanced MBMS service (E-MBMS). E-MBMS can share carriers with unicast service, and can also use a separate carrier, i.e., separate large cell coverage mode. The compact integration of unicast and MBMS services is able to provide subscribers with services in a more efficient way.

In the existing protocols, pilot signals related to E-MBMS are mapped with respect to a single transmit antenna. In a TDM (Time Division Multiplexing) case of E-MBMS and unicast services, two types of pilot signals are placed within an E-MBMS subframe, one type is used for E-MBMS channel estimation, and the other type is used for unicast service pilot symbols for controlling channel decoding. At present, pilot templates are each designed on the basis of a single transmit antenna situation taking into account of the mixing co-existence of unicast service and E-MBMS, i.e., the two types of services are time division multiplexed at a subframe level. Pilot signal mapping based on multi-transmit-antenna, however, has not been considered in the TDM case of E-MBMS and unicast services.

There is yet no proposal about how to set pilot signals in an E-MBMS subframe and map them to transmit antennas when there is more than one transmit antennas so that at a reception side respective channel estimations can be performed for both of E-MBMS and unicast services based on the received pilot signals.

SUMMARY OF THE INVENTION

An object of the present invention is to provide a method and apparatus for generating pilot signals in a Time Division Multiplexing mode of E-MBMS service and unicast service, which can map two types of pilot signals to multiple transmit antennas and transmit the pilot signals so that a reception side can perform channel estimations for the E-MBMS service and unicast service, respectively, based on the received pilot signals.

To achieve the above object, an aspect of the present invention is to provide a method for mapping pilot signals in a multiplexing mode of unicast service and Multimedia Broadcast/Multicast Service (MBMS). The method comprises the steps of:

generating pilot symbols for the unicast service and the MBMS service, respectively;

mapping the pilot symbols for the MBMS service to multiple transmit antennas such that, in a subframe, the pilot symbols for the MBMS service for each antenna are arranged in a same time domain and adjacent to each other, the pilot symbols for the MBMS service for the same transmit antenna are spaced from each other by one subcarrier in the frequency domain and by four Orthogonal Frequency Division Multiplexing (OFDM) symbols in the time domain, and the pilot symbols for the MBMS service for the same transmit antenna are arranged in a staggered form along the time domain, and mapping the pilot symbols for the unicast service at the same time, wherein control channel for the unicast service occupies a column of OFDM symbols;

time division multiplexing the pilot symbols for the unicast and MBMS services, and transmitting them via the multiple transmit antennas; and at the reception side, receiving the pilot signals, and performing channel estimations for the unicast and MBMS services, respectively, based on the received pilot signals.

Another aspect of the present invention is to provide a method for mapping pilot signals in a multiplexing mode of unicast service and Multimedia Broadcast/Multicast Service (MBMS) The method comprises the steps of:

generating pilot symbols for the unicast service and the MBMS service, respectively;

mapping the pilot symbols for the MBMS service to multiple transmit antennas such that, in a subframe, the pilot symbols for the MBMS service for each antenna are arranged in a same time domain and adjacent to each other, the pilot symbols for the MBMS service for the same transmit antenna are spaced from each other by two subcarriers in the frequency domain and by two Orthogonal Frequency Division Multiplexing (OFDM) symbols in the time domain, and the pilot symbols for the MBMS service for the same transmit antenna are arranged in a staggered form along the time domain, and mapping the pilot symbols for the unicast service at the same time, wherein control channel for the unicast service occupies a column of OFDM symbols;

time division multiplexing the pilot symbols for the unicast and MBMS services, and transmitting them via the multiple transmit antennas; and at the reception side, receiving the pilot signals, and performing channel estimations for the unicast and MBMS services, respectively, based on the received pilot signals.

A further aspect of the present invention is to provide a method for mapping pilot signals in a multiplexing mode of unicast service and Multimedia Broadcast/Multicast Service (MBMS). The method comprises the steps of:

generating pilot symbols for the unicast service and the MBMS service, respectively;

mapping the pilot symbols for the MBMS service to multiple transmit antennas such that, in a subframe, the pilot symbols for the MBMS service for each antenna are arranged in a same time domain and adjacent to each other, the pilot symbols for the MBMS service for the same transmit antenna are spaced from each other by one subcarrier in the frequency domain and by three Orthogonal Frequency Division Multiplexing (OFDM) symbols in the time domain, and the pilot symbols for the MBMS service for the same transmit antenna are arranged in a staggered form along the time domain, and mapping the pilot symbols for the unicast service at the same time, wherein control channel for the unicast service occupies two columns of OFDM symbols;

time division multiplexing the pilot symbols for the unicast and MBMS services, and transmitting them via the multiple transmit antennas; and at the reception side, receiving the pilot signals, and performing channel estimations for the unicast and MBMS services, respectively, based on the received pilot signals.

A yet further aspect of the present invention is to provide a method for mapping pilot signals in a multiplexing mode of unicast service and Multimedia Broadcast/Multicast Service (MBMS). The method comprises the steps of:

generating pilot symbols for the unicast service and the MBMS service, respectively;

mapping the pilot symbols for the MBMS service to multiple transmit antennas such that, in a subframe, the pilot symbols for the MBMS service for each antenna are arranged in a same time domain and adjacent to each other, the pilot symbols for the MBMS service for the same transmit antenna are spaced from each other by two subcarriers in the frequency domain and by two Orthogonal Frequency Division Multiplexing (OFDM) symbols in the time domain, and the pilot symbols for the MBMS service for the same transmit antenna are arranged in a staggered form along the time domain, and mapping the pilot symbols for the unicast service at the same time, wherein control channel for the unicast service occupies two columns of OFDM symbols;

time division multiplexing the pilot symbols for the unicast and MBMS services, and transmitting them via the multiple transmit antennas; and at the reception side, receiving the pilot signals, and performing channel estimations for the unicast and MBMS services, respectively, based on the received pilot signals.

A yet further aspect of the present invention is to provide a method for mapping pilot signals in a multiplexing mode of unicast service and Multimedia Broadcast/Multicast Service (MBMS). The method comprises the steps of:

generating pilot symbols for the unicast service and the MBMS service, respectively;

mapping the pilot symbols for the MBMS service to multiple transmit antennas such that, in a subframe, the pilot symbols for the MBMS service for each antenna are arranged in a same time domain and adjacent to each other, the pilot symbols for the MBMS service for the same transmit antenna are spaced from each other by one subcarrier in the frequency domain and by three Orthogonal Frequency Division Multiplexing (OFDM) symbols in the time domain, and the pilot symbols for the MBMS service for the same transmit antenna are arranged in a staggered form along the time domain, and mapping the pilot symbols for the unicast service at the same time, wherein control channel for the unicast service occupies three columns of OFDM symbols;

time division multiplexing the pilot symbols for the unicast and MBMS services, and transmitting them via the multiple transmit antennas; and at the reception side, receiving the pilot signals, and performing channel estimations for the unicast and MBMS services, respectively, based on the received pilot signals.

A yet further aspect of the present invention is to provide a method for mapping pilot signals in a multiplexing mode of unicast service and Multimedia Broadcast/Multicast Service (MBMS). The method comprises the steps of:

generating pilot symbols for the unicast service and the MBMS service, respectively;

mapping the pilot symbols for the MBMS service to multiple transmit antennas such that, in a subframe, the pilot symbols for the MBMS service for each antenna are arranged in a same time domain and adjacent to each other, the pilot symbols for the MBMS service for the same transmit antenna are spaced from each other by two subcarriers in the frequency domain and by three Orthogonal Frequency Division Multiplexing (OFDM) symbols in the time domain, and the pilot symbols for the MBMS service for the same transmit antenna are arranged in a staggered form along the time domain, and mapping the pilot symbols for the unicast service at the same time, wherein control channel for the unicast service occupies three columns of OFDM symbols;

time division multiplexing the pilot symbols for the unicast and MBMS services, and transmitting them via the multiple transmit antennas; and at the reception side, receiving the pilot signals, and performing channel estimations for the unicast and MBMS services, respectively, based on the received pilot signals.

A still further aspect of the present invention is to provide an apparatus for mapping pilot signals in a multiplexing mode of unicast service and Multimedia Broadcast/Multicast Service (MBMS). The apparatus comprises:

a pilot symbol generator for generating pilot symbols for the unicast service and the MBMS service;

a unicast pilot symbol template generator for mapping, to multiple transmit antennas, pilot symbols for channel estimation of unicast service, based on the pilot symbols provided from the pilot symbol generator;

a MBMS pilot symbol template generator for mapping, based on the pilot symbols provided from the pilot symbol generator, pilot symbols for the MBMS service to multiple transmit antennas such that, in a subframe, the pilot symbols for the MBMS service for each antenna are arranged in a same time domain and adjacent to each other, the pilot symbols for the MBMS service for the same transmit antenna are spaced from each other by a predetermined number of subcarriers in the frequency domain and by predetermined number of Orthogonal Frequency Division Multiplexing (OFDM) symbols in the time domain, and the pilot symbols for the MBMS service for the same transmit antenna are arranged in a staggered form along the time domain, and for mapping the pilot symbols for the unicast service at the same time;

a pilot signal synthesizer for time division multiplexing the pilot symbols for the unicast and MBMS services.

With the method for mapping pilot signals to a multi-transmit-antenna system of the present invention, the reception side can perform channel estimations for the unicast and MBMS services, respectively, based on the received pilot signals.

BRIEF DESCRIPTION OF THE DRAWINGS

The above and other objects, features and advantages of the present invention will be more apparent from the following description of preferred embodiments with reference to the drawings, in which.

DETAILED DESCRIPTION OF THE PREFERRED EMBODIMENTS

A detailed description of preferred embodiments of the present invention will be given below in conjunction with the drawings. In the description, any detail and function unnecessary to the present invention are omitted so that the above objects, features and advantages of the present invention will not be obscured.

Due to highly frequency selectivity resulted from long cyclic prefix (CP) for 16.67 μs of Multimedia Broadcast Single Frequency Network (MBSFN) channel, the pilot subcarrier spacing is smaller than in unicast.

It prior art, at most the first three OFDM symbols of an E-MBMS subframe can be used as downlink (DL) L1/L2 control channel for unicast. In view of this, the present invention proposes various methods for mapping pilot signals for multicast in a multi-antenna environment with respect to different situations where the first OFDM symbol, the first two OFDM symbols and the first three OFDM symbols are used as DL L1/L2 control channel in unicast.

Figure 1A:
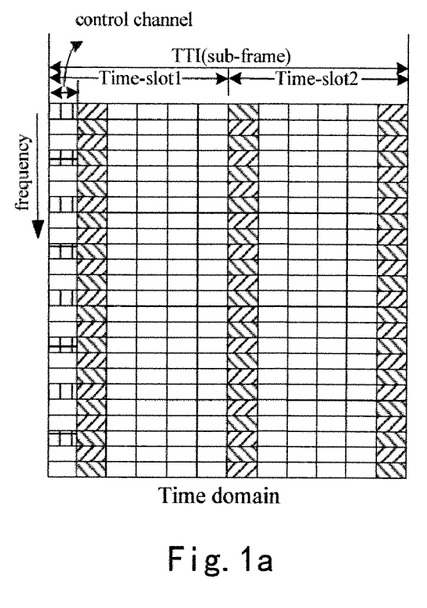
FIGS. 1a to 1f are schematic diagrams showing respective arrangements for mapping pilot signals to multiple transmit antennas in a multiplexing mode of E-MBMS and unicast services according to various embodiments of the present invention.

Further, the mapping pattern of pilot signals for unicast is fixed in the multi-antenna environment. As shown in FIGS. 1a to 1f, in a two-antenna environment, the pilot symbols u1 for antenna 1 and the pilot symbols u2 for antenna 2 in unicast are mapped to different subcarriers in a single spacing s1, respectively, with the symbols u1, u2 being spaced from each other. The number of the subcarriers between each pair of the pilot symbols u1, u2 is kept constant, for example, there may be two subcarriers between u1 and u2, as shown in FIG. 1a.

Various embodiments of mapping pilot signals to multiple transmit antennas in a time division multiplexing mode of E-MBMS and unicast services will be described with reference to FIGS. 1a to 1f, in which the horizontal axis represents time domain, and the vertical axis represents frequency domain. Each TTI represents a single subframe which can include two time slots. Each subframe is divided into a plurality of spacings, each of which is equal to one OFDM symbol in time length. In the present embodiment, each subframe can include 12 spacings, such as s1, s2, s3 ... s10, s11 and s12 successively from left to right. The spacings correspond to subcarriers in different frequencies, such as f1, f2, f3, ..., successively from top to bottom, in frequency domain.

In FIGS. 1a to 1f, each block represents one OFDM symbol in time domain and one subcarrier in frequency domain.

In FIGS. 1a to 1f, the pattern "▦" represents the pilot signal u1 mapped to antenna 1 for unicast, the pattern "▤" represents the pilot signal u2 mapped to antenna 2 for unicast, the pattern "▨" represents the pilot signal M1 mapped to antenna 1 for broadcast/multicast, and the pattern "▧" represents the pilot signal M2 mapped to antenna 2 for broadcast/multicast. The blank block denotes where data to be filled in FIGS. 1a to 1f.

To be noted, two antennas are taken as example to illustrate the method for mapping pilot signals to these antennas in the embodiments of the present invention. To those skilled in the art, it will be appreciated that the present invention is not limited to the specific example, and the basic idea of the present invention can be applied to any multi-transmit-antenna system having more than two antennas.

Reference is now made to FIG. 1a depicting the first embodiment of pilot signal mapping. FIG. 1a shows an arrangement for pilot signal mapping within a single subframe. The DL L1/L2 control channel for unicast occupies the first spacing along a left-to-right direction in time domain, as shown in FIG. 1a. The pilot signals u1 and u2 for unicast are first mapped in the spacing s1. The pilot symbols u1 for antenna 1 and the pilot symbols u2 for antenna 2 in unicast are mapped to different subcarriers in a single spacing s1, respectively, with the symbols u1, u2 being spaced from each other. The number of the subcarriers between each pair of the pilot symbols u1, u2 is kept constant, for example, there may be two subcarriers between u1 and u2, as shown in FIG. 1a.

Then, immediately subsequent to the control channel, the pilot symbols M1 for antenna 1 and the pilot symbols M2 for antenna 2 in E-MBMS are mapped separately in the subframe. As shown in FIG. 1a, the pilot symbols M1 for antenna 1 are spaced by one subcarrier along the frequency domain direction. That is, the pilot symbols M1 have a period of two subcarriers. The pilot symbols M2 for antenna 2 are also spaced by one subcarrier, that is, the pilot symbols M2 have a period of two subcarriers. Further, the pilot symbols M1 for antenna 1 and the pilot symbols M2 for antenna 2 are mapped in a single spacing s and adjacent to each other. The pilot symbols for each antenna are spaced by four OFDM symbols in the time domain direction. That is, the pilot symbols for each antenna have a period of five OFDM symbols in the time domain direction. The pilot symbols for one same antenna are arranged in a staggered manner in time domain.

Specifically, in the subframe shown in FIG. 1a, the pilot symbols M1 and M2 are mapped adjacent to each other in the spacing s2, that is, M1 and M2 are adjacent to each other in frequency domain. The pilot symbols M1 and M2 are then mapped adjacent to each other in the spacing s7 which is 4 spacings away from the spacing 2. The pilot symbols for one same antenna are arranged in a staggered manner in time domain. That is, the pilot symbols M1 for antenna 1 are mapped in the spacings s2 and s7 in a staggered manner. Again, the pilot symbols M2 for antenna 2 are mapped in the spacings s2 and s7 in a staggered manner. The pilot symbols M1 and M2 are then mapped adjacent to each other in the spacing s11 which is 4 spacings away from the spacing 7. The pilot symbols for one same antenna are arranged in the spacings s7 and s11 in a staggered manner. As such, the pilot symbols for E-MBMS are mapped to two antennas in one subframe.

The process of mapping pilot signals within one subframe in the time division multiplexing mode of E-MBMS and unicast services is thus completed, and a TTI is formed. The process of mapping pilot signals for E-MBMS and unicast services within a next subframe is identical to the above process.

Figure 1B:
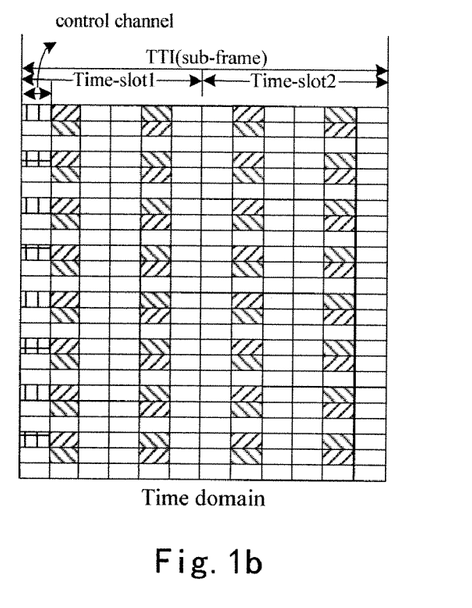

Reference is now made to FIG. 1b depicting the second embodiment of pilot signal mapping in a time division multiplexing mode of E-MBMS and unicast services. FIG. 1b shows an arrangement for pilot signal mapping within a single subframe. The DL L1/L2 control channel for unicast occupies the first spacing along a left-to-right direction in time domain, as shown in FIG. 1b. Here, the pilot signals for unicast are mapped in the same manner as in the first embodiment. For the sake of simplify, description of any content the same as in the first embodiment will be omitted.

Immediately subsequent to the control channel, the pilot symbols M1 for antenna 1 and the pilot symbols M2 for antenna 2 in E-MBMS are mapped separately in the subframe. As shown in FIG. 1b, the pilot symbols M1 for antenna 1 are spaced by two subcarriers along the frequency domain direction. That is, the pilot symbols M1 have a period of three subcarriers. The pilot symbols M2 for antenna 2 are also spaced by two subcarriers, that is, the pilot symbols M2 have a period of three subcarriers. Further, the pilot symbols M1 for antenna 1 and the pilot symbols M2 for antenna 2 are mapped in a single spacing s and adjacent to each other, and each pair of the adjacent pilot symbols M1, M2 are spaced by one subcarrier, shown as blank spacing in FIG. 1b. The pilot symbols for each antenna are spaced by two OFDM symbols in the time domain direction. That is, the pilot symbols for each antenna have a period of three OFDM symbols in the time domain direction. The pilot symbols for one same antenna are arranged in a staggered manner in time domain.

Specifically, in the subframe shown in FIG. 1b, the pilot symbols M1 for antenna 1 are mapped in the spacing s2 in a period of three subcarriers, and the pilot symbols M2 for antenna 2 are mapped adjacent to the pilot symbols M1, respectively, in a period of three subcarriers. In this way, the pilot symbols M1 and M2 adjacent to each other in frequency domain can form a set of pilot symbols, and each set is spaced from another set by one subcarrier in frequency domain Again, the pilot symbols M1 and M2 are mapped in a period of three subcarriers, respectively, in the spacing s5 which is two spacings (OFDM symbols) away from the spacing s2 (i.e., in a period of three OFDM symbols). The pilot symbols for one same antenna are arranged in a staggered manner in time domain. That is, the pilot symbols M1 for antenna 1 are mapped in the spacings s2 and s5 in a staggered manner. Again, the pilot symbols M2 for antenna 2 are mapped in the spacings s2 and s5 in a staggered manner. The pilot symbols M1 and M2 are then mapped, in the same way as in the spacing 2, in the spacing s8 which is 2 spacings away from the spacing 5. The pilot symbols for one same antenna are arranged in the spacings s5 and s8 in a staggered manner. Finally, the pilot symbols M1 and M2 are mapped, in the same way as in the spacing 5, in the spacing s11 which is 2 spacings away from the spacing 8. The pilot symbols for one same antenna are arranged in the spacings s8 and s11 in a staggered manner. As such, the pilot symbols for E-MBMS are mapped to two antennas in one subframe.

The process of mapping pilot signals within one subframe in the time division multiplexing mode of E-MBMS and unicast services is thus completed, and a TTI is formed. The process of mapping pilot signals for E-MBMS and unicast services within a next subframe is identical to the above process.

Figure 1C:
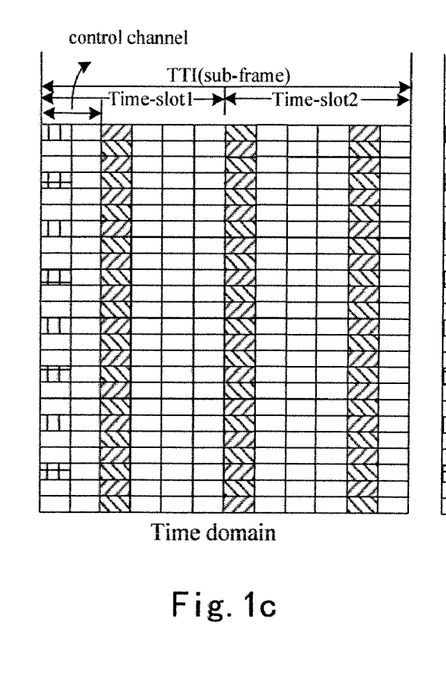

Reference is now made to FIG. 1c depicting the third embodiment of pilot signal mapping in a time division multiplexing mode of E-MBMS and unicast services. FIG. 1c shows an arrangement for pilot signal mapping within a single subframe. The DL L1/L2 control channel for unicast occupies the first two spacings along a left-to-right direction in time domain, as shown in FIG. 1c. Here, the pilot signals for unicast are mapped in the same way as in the first embodiment. For the sake of simplify, description of any content the same as in the above embodiments will be omitted.

Immediately subsequent to the control channel, the pilot symbols M1 for antenna 1 and the pilot symbols M2 for antenna 2 in E-MBMS are mapped separately in the subframe. As shown in FIG. 1c, the pilot symbols M1 for antenna 1 are spaced by one subcarrier along the frequency domain direction. That is, the pilot symbols M1 have a period of two subcarriers. The pilot symbols M2 for antenna 2 are also spaced by one subcarrier, that is, the pilot symbols M2 have a period of two subcarriers. Further, the pilot symbols M1 for antenna 1 and the pilot symbols M2 for antenna 2 are mapped in a single spacing s and adjacent to each other. The pilot symbols for each antenna are spaced by three OFDM symbols in the time domain direction. That is, the pilot symbols for each antenna have a period of four OFDM symbols in the time domain direction. The pilot symbols for one same antenna are arranged in a staggered manner in time domain.

Specifically, in the process of mapping the pilot symbols M1 and M2 in each subframe as shown in FIG. 1c, the pilot symbols M1 and M2 are mapped in a period of 4 OFDM symbols in time domain. The pilot symbols M1 and M2 are mapped adjacent to each other in the spacings s3, s6 and s11, respectively, in frequency domain. That is, M1 and M2 are adjacent in frequency domain. In the third embodiment, the pilot symbols M1 and M2 are mapped in the respective spacings in the same way as in the first embodiment in frequency domain, and thus description thereof is omitted. Briefly, the pilot symbols M1 and M2 are mapped in the spacings s3, s6 and s11, respectively, in the third embodiment. As such, the pilot symbols for E-MBMS are mapped to two antennas in one subframe.

The process of mapping pilot signals within one subframe in the time division multiplexing mode of E-MBMS and unicast services is thus completed, and a TTI is formed. The process of mapping pilot signals for E-MBMS and unicast services within a next subframe is identical to the above process.

Figure 1D:
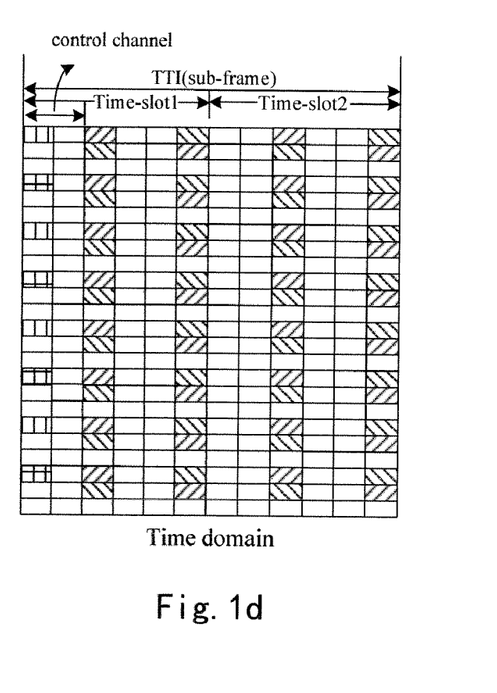

Reference is now made to FIG. 1d depicting the fourth embodiment of pilot signal mapping in a time division multiplexing mode of E-MBMS and unicast services. FIG. 1d shows an arrangement for pilot signal mapping within a single subframe. The DL L1/L2 control channel for unicast occupies the first two spacings along a left-to-right direction in time domain, as shown in FIG. 1d. Here, the pilot signals for unicast are mapped in the same way as in the first embodiment. For the sake of simplify, description of any content the same as in the above embodiments will be omitted.

Immediately subsequent to the control channel, the pilot symbols M1 for antenna 1 and the pilot symbols M2 for antenna 2 in E-MBMS are mapped separately in the subframe. As shown in FIG. 1d, the pilot symbols M1 for antenna 1 are spaced by two subcarriers along the frequency domain direction. That is, the pilot symbols M1 have a period of three subcarriers. The pilot symbols M2 for antenna 2 are also spaced by two subcarriers, that is, the pilot symbols M2 have a period of three subcarriers. Further, the pilot symbols M1 for antenna 1 and the pilot symbols M2 for antenna 2 are mapped in a single spacing s and adjacent to each other, and each pair of adjacent pilot symbols M1 and M2 are spaced by one subcarrier from another pair, shown as the blank spacings in FIG. 1d. The pilot symbols for each antenna are spaced by two OFDM symbols in the time domain direction. That is, the pilot symbols for each antenna have a period of three OFDM symbols in the time domain direction. The pilot symbols for one same antenna are arranged in a staggered manner in time domain.

Specifically, in the subframe shown in FIG. 1d, the pilot symbols M1 and M2 are mapped in the respective spacings in the same way as in the second embodiment. The mapping of pilot symbols for E-MBMS in the fourth embodiment is different from that in the second embodiment in that the pilot symbols for E-MBMS are displaced leftward by one OFDM symbol, that is, the pilot symbols M1 and M2 are mapped in the spacings s3, s6, s9 and s12, respectively. As such, the pilot symbols for E-MBMS are mapped to two antennas in one subframe.

The process of mapping pilot signals within one subframe in the time division multiplexing mode of E-MBMS and unicast services is thus completed, and a TTI is formed. The process of mapping pilot signals for E-MBMS and unicast services within a next subframe is identical to the above process.

Figure 1E:
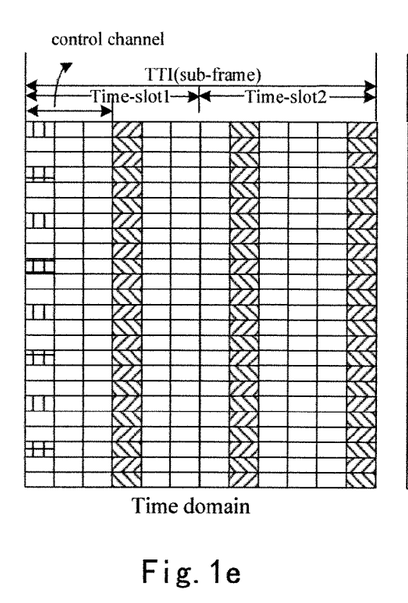

Reference is now made to FIG. 1e depicting the fifth embodiment of pilot signal mapping in a time division multiplexing mode of E-MBMS and unicast services. FIG. 1e shows an arrangement for pilot signal mapping within a single subframe. The DL L1/L2 control channel for unicast occupies the first three spacings along a left-to-right direction in time domain, as shown in FIG. 1e. Here, the pilot signals for unicast are mapped in the same way as in the first embodiment. For the sake of simplify, description of any content the same as in the above embodiments will be omitted.

Immediately subsequent to the control channel, the pilot symbols M1 for antenna 1 and the pilot symbols M2 for antenna 2 in E-MBMS are mapped separately in the subframe. As shown in FIG. 1e, the pilot symbols M1 for antenna 1 are spaced by one subcarrier along the frequency domain direction. That is, the pilot symbols M1 have a period of two subcarriers. The pilot symbols M2 for antenna 2 are also spaced by one subcarrier, that is, the pilot symbols M2 have a period of two subcarriers. Further, the pilot symbols M1 for antenna 1 and the pilot symbols M2 for antenna 2 are mapped in a single spacing s and adjacent to each other. The pilot symbols for each antenna are spaced by three OFDM symbols in the time domain direction. That is, the pilot symbols for each antenna have a period of four OFDM symbols in the time domain direction. The pilot symbols for one same antenna are arranged in a staggered manner in time domain.

Specifically, in the process of mapping the pilot symbols M1 and M2 in each subframe as shown in FIG. 1e, the pilot symbols M1 and M2 are mapped in a period of 4 OFDM symbols in time domain. The pilot symbols M1 and M2 are mapped adjacent to each other in the spacings s4, s7 and s12, respectively, in frequency domain. That is, M1 and M2 are adjacent in frequency domain. In the fifth embodiment, the pilot symbols M1 and M2 are mapped in the respective spacings in the same way as in the third embodiment in frequency domain. The mapping of pilot symbols for E-MBMS in the fifth embodiment is different from that in the third embodiment in that the pilot symbols for E-MBMS are displaced leftward by one OFDM symbol, that is, the pilot symbols M1 and M2 are mapped in the spacings s4, s7 and s12, respectively. As such, the pilot symbols for E-MBMS are mapped to two antennas in one subframe.

The process of mapping pilot signals within one subframe in the time division multiplexing mode of E-MBMS and unicast services is thus completed, and a TTI is formed. The process of mapping pilot signals for E-MBMS and unicast services within a next subframe is identical to the above process.

Figure 1F:
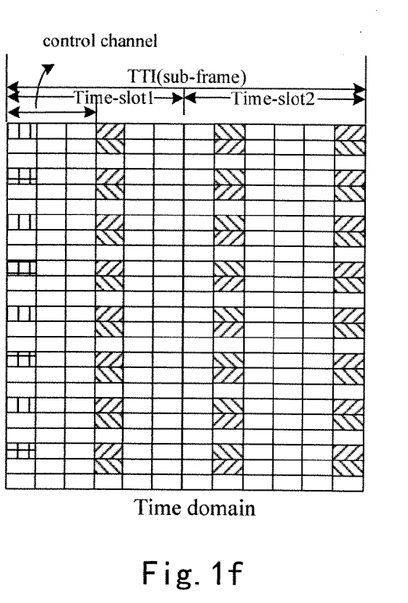

Reference is now made to FIG. 1f depicting the sixth embodiment of pilot signal mapping in a time division multiplexing mode of E-MBMS and unicast services. FIG. 1f shows an arrangement for pilot signal mapping within a single subframe. The DL L1/L2 control channel for unicast occupies the first three spacings along a left-to-right direction in time domain, as shown in FIG. 1f. Here, the pilot signals for unicast are mapped in the same way as in the first embodiment. For the sake of simplify, description of any content the same as in the above embodiments will be omitted.

Immediately subsequent to the control channel, the pilot symbols M1 for antenna 1 and the pilot symbols M2 for antenna 2 in E-MBMS are mapped separately in the subframe. As shown in FIG. 1f, the pilot symbols M1 for antenna 1 are spaced by two subcarriers along the frequency domain direction. That is, the pilot symbols M1 have a period of three subcarriers. The pilot symbols M2 for antenna 2 are also spaced by two subcarriers, that is, the pilot symbols M2 have a period of three subcarriers. Further, the pilot symbols M1 for antenna 1 and the pilot symbols M2 for antenna 2 are mapped in a single spacing s and adjacent to each other, and each pair of the adjacent pilot symbols M1, M2 are spaced from another pair by one subcarrier, shown as blank spacings in FIG. 1f. The pilot symbols for each antenna are spaced by three OFDM symbols in the time domain direction. That is, the pilot symbols for each antenna have a period of four OFDM symbols in the time domain direction. The pilot symbols for one same antenna are arranged in a staggered manner in time domain.

Specifically, in the subframe shown in FIG. 1f, the pilot symbols M1 and M2 are mapped in the respective spacings in the same way as in the second embodiment. The mapping of the pilot symbols for E-MBMS in the sixth embodiment is different from that in the second embodiment in that the pilot symbols M1, M2 for E-MBMS are mapped in the three spacings S4, S8 and S12, other than in four spacings of the second and fourth embodiments. As such, the pilot symbols for E-MBMS are mapped to two antennas in one subframe.

The process of mapping pilot signals within one subframe in the time division multiplexing mode of E-MBMS and unicast services is thus completed, and a TTI is formed. The process of mapping pilot signals for E-MBMS and unicast services within a next subframe is identical to the above process.

The foregoing describes the various embodiments of mapping pilot signals for unicast and E-MBMS services to multiple transmit antennas in the time division multiplexing mode of E-MBMS and unicast services. Thereafter, the multi-transmit-antenna system transmits the mapped pilot symbols. At the reception side, a mobile communication terminal, such as mobile phone, portable computer, personal digital assistant (PDA) and the like, receives the pilot signals, and devices in the terminal performs channel estimation for unicast and E-MBMS services based on the received pilot signals.

Figure 2:
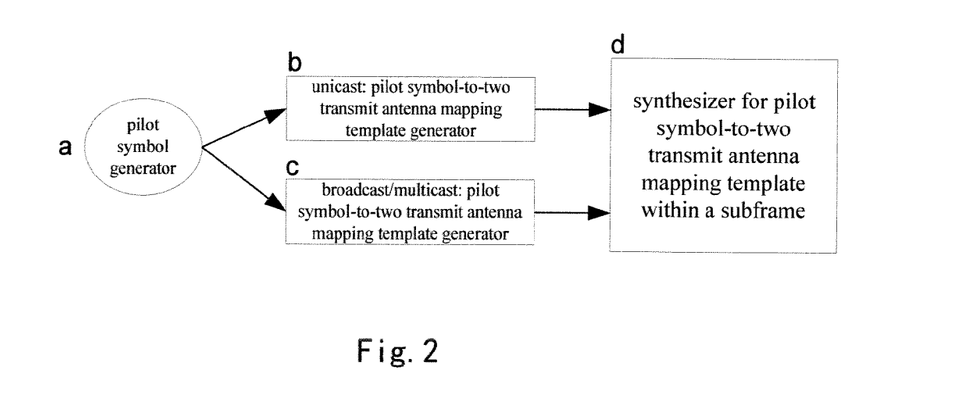
FIG. 2 shows a block diagram of an apparatus for mapping unicast and broadcast/multicast pilot signals according to the embodiments of the present invention.

FIG. 2 shows a block diagram of an apparatus for mapping unicast and broadcast/multicast pilot signals according to the embodiments of the present invention. The apparatus for pilot signal mapping of the present invention comprises a pilot symbol generator 21, a unicast pilot symbol mapping template generator 22, an E-MBMS pilot symbol mapping template generator 23 and a pilot signal synthesizer 24.

Now, the operation of the apparatus for pilot signal mapping of the present invention is described. The pilot symbol generator 21 generates pilot symbols for unicast and E-MBMS services and provides the generated pilot symbols to the unicast pilot symbol mapping template generator 22 and the E-MBMS pilot symbol mapping template generator 23, respectively. As an example in the present invention, the pilot symbol generator 21 can adopt a typical QPSK modulation, where R=⅓. The unicast pilot symbol mapping template generator 22, based on the pilot symbols provided from the pilot symbol generator 21, maps the pilot symbols for channel estimation of unicast service to two antennas according to any one of the methods described in the above first to sixth embodiments. The E-MBMS pilot symbol mapping template generator 23, based on the pilot symbols provided from the pilot symbol generator 21, maps the pilot symbols for channel estimation of unicast service to the two antennas according to any one of the methods described in the above first to sixth embodiments. The pilot symbols mapped by the unicast pilot symbol mapping template generator 22 and the E-MBMS pilot symbol mapping template generator 23 are provided to the pilot signal synthesizer 24, which multiplexes data provided from a data symbol generator (not shown) and the pilot symbols for unicast and E-MBMS services mapped to the two antennas so as to obtain the pilot signals within the subframe. Thereafter, the obtained signals are transmitted via these transmit antennas.

Figure 3:
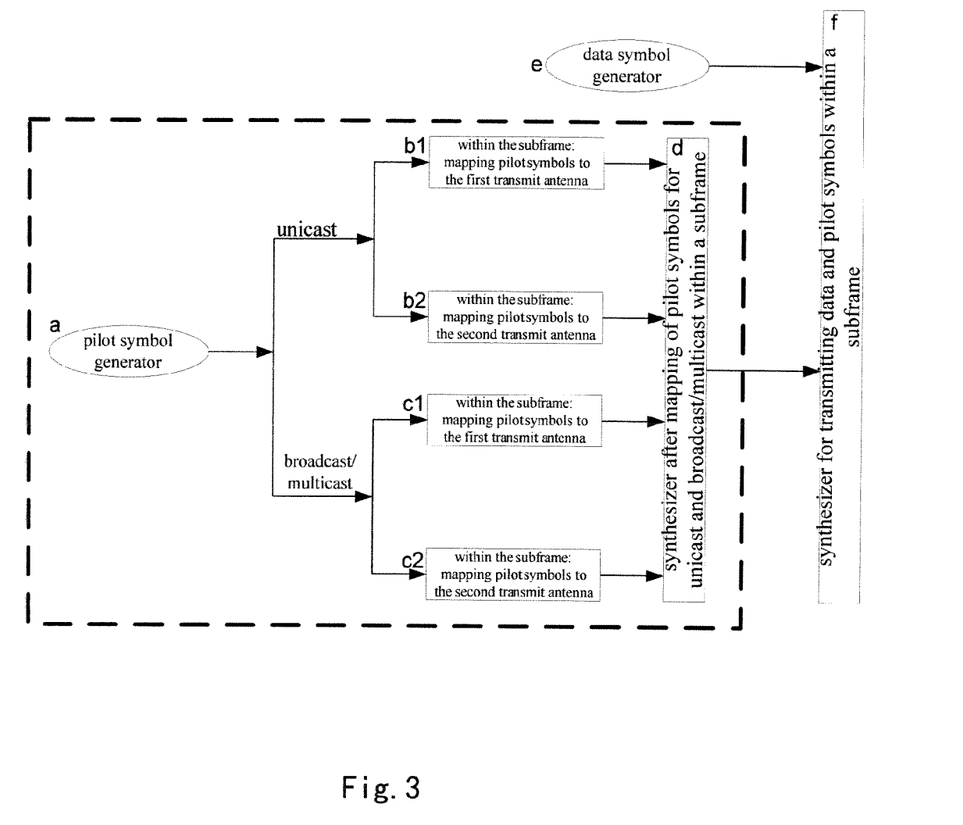
FIG. 3 shows a flowchart of a method for mapping unicast and broadcast/multicast pilot signals in a subframe according to the embodiments of the present invention.

Reference is now made to FIG. 3 showing a process of mapping unicast and broadcast/multicast pilot signals in a subframe. First, pilot symbols for unicast and E-MBMS services are generated by the pilot symbol generator at Block a. Then, the generated pilot symbols are divided into four branches according to any one of the methods described in the above first to sixth embodiments. The pilot symbols u1 for unicast service within one subframe are mapped to the first antenna at the branch of Block b1. The pilot symbols u2 for unicast service within one subframe are mapped to the second antenna at the branch of Block b2. The pilot symbols M1 for E-MBMS service within one subframe are mapped to the first antenna at the branch of Block c1. The pilot symbols M2 for E-MBMS service within one subframe are mapped to the second antenna at the branch of Block c2. It should be noted that the branches of b1 to c2 can be processed in parallel. Thereafter, at Block d the pilot symbols for unicast and E-MBMS services mapped to the two antennas are time division multiplexed to obtain the pilot signals described in any of the above first to sixth embodiments. Next, the obtained pilot signals are synthesized with data symbols generated by a data symbol generator (not shown) in Block e to obtained the signals to be transmitted in the subframe, and the obtained synthesized signals are transmitted via the multiple transmit antennas.

It should be noted that the primary difference between the methods for mapping pilot signals to multiple transmit antennas in the first to sixth embodiments are mapping of pilot signals for E-MBMS and spacings occupied by the control channel. The first, third and fifth embodiments (see FIGS. 1a, 1c and 1e) are similar in terms of mapping of pilot signals for E-MBMS, and they are different in OFDM symbols by which the pilot signals for channel estimation of E-MBMS are spaced in time domain within one subframe.

Figure 4:
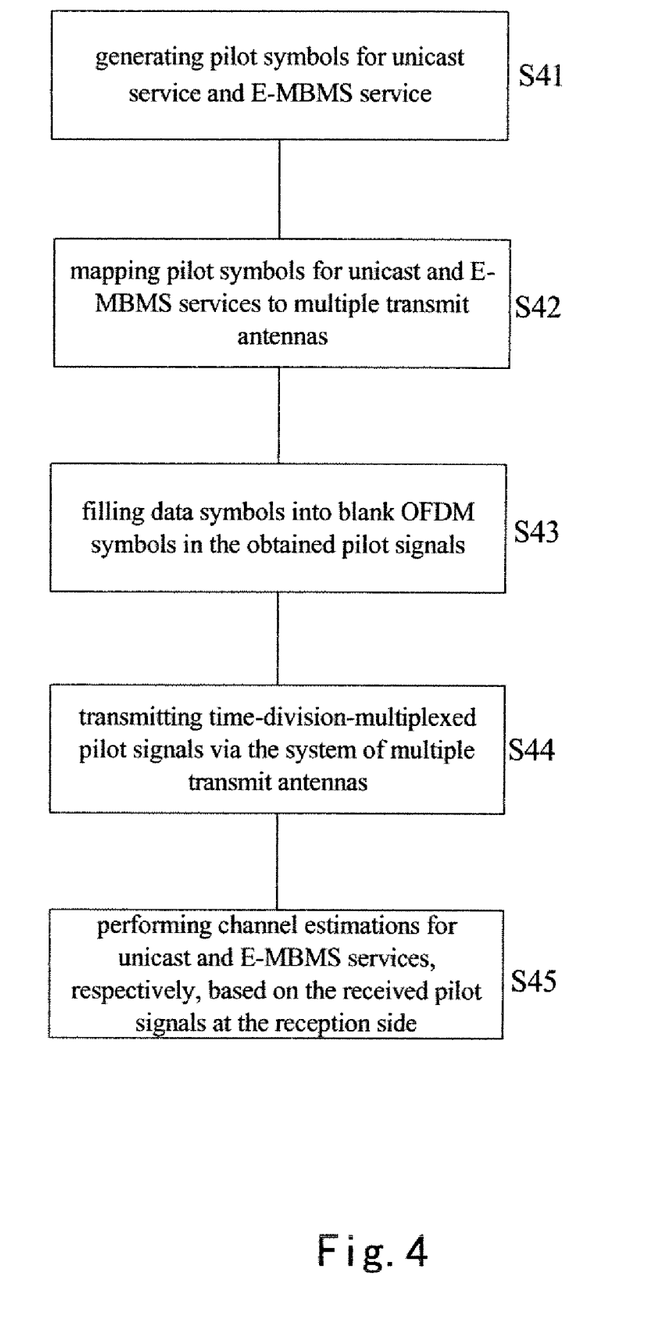
FIG. 4 shows a flowchart of a method for mapping pilot signals to multiple transmit antennas in a multiplexing mode of unicast and MBMS services according to the embodiments of the present invention.

FIG. 4 shows a flowchart of a method for mapping pilot signals to multiple transmit antennas in a multiplexing mode of unicast and MBMS services according to the embodiments of the present invention At step S41, pilot symbols for unicast and E-MBMS services are generated. At step S42, the pilot symbols for unicast and E-MBMS services are mapped to the multiple transmit antennas, respectively, to obtain time-division-multiplexed pilot signals. Next, at step S43, OFDM symbols to which no pilot symbol is mapped in the subframe are filled with data symbols so as to obtain synthesized signals in the time division multiplexing mode of unicast and MBMS services. The synthesized signals are transmitted via the multiple transmit antennas at step S44. At the reception side, channel estimations for unicast and MBMS services are performed respectively based on the received pilot signals at step S45.

Figure 5A:
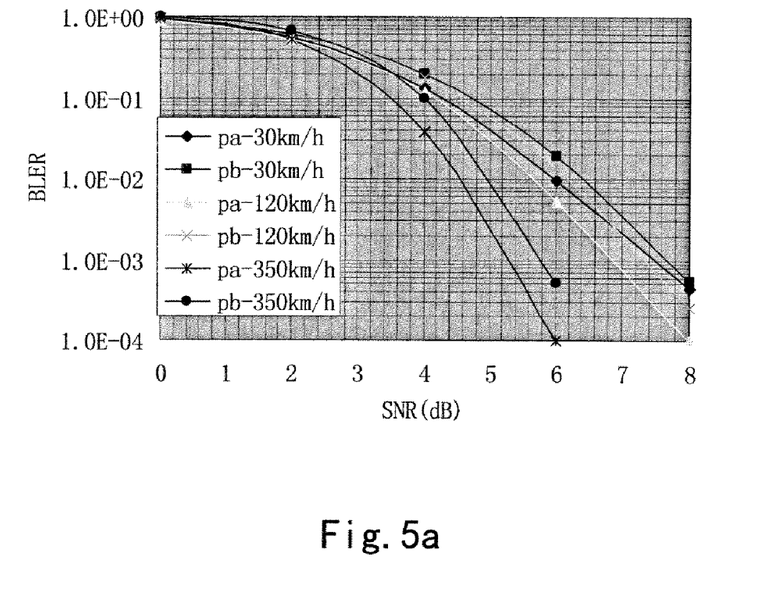
FIGS. 5a and 5b are schematic diagrams showing Block Error Rate (BLER) and data throughput obtained by pilot signals mapped according to an embodiment of the present invention, respectively.
Figure 5B:
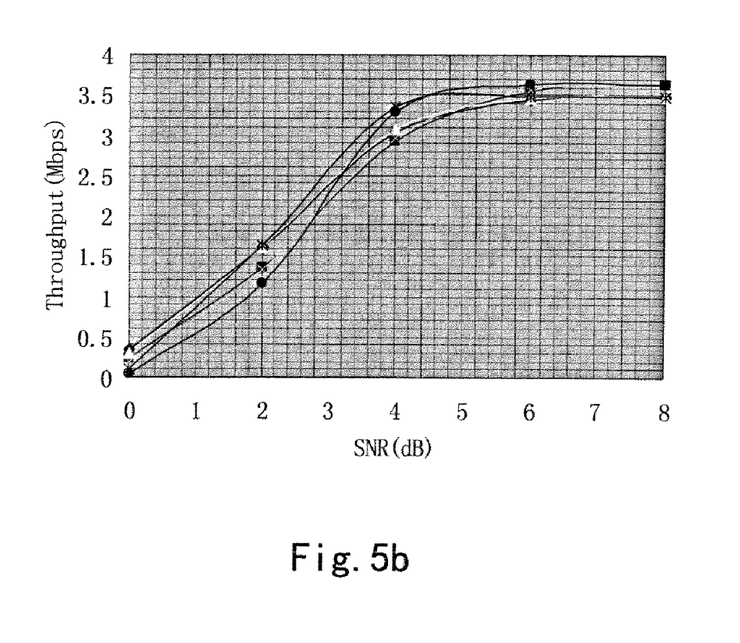
Figure 6A:
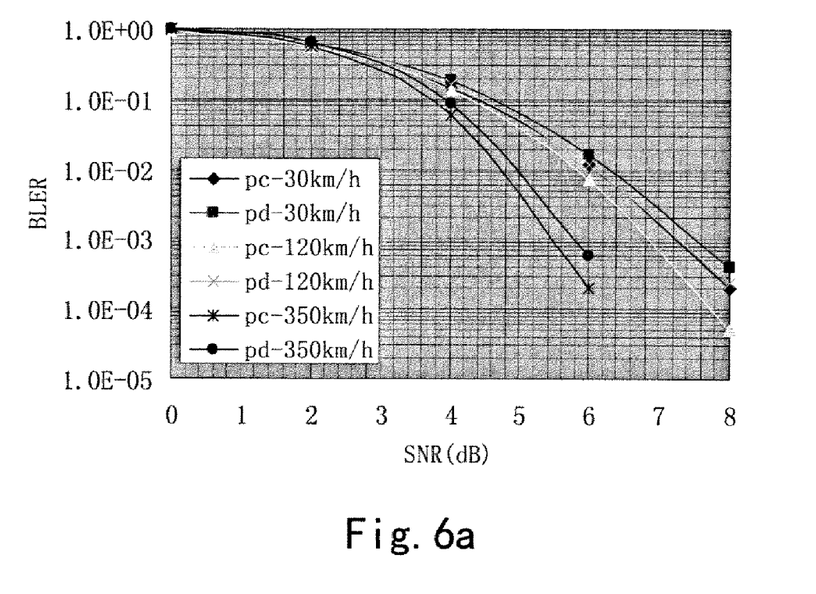
FIGS. 6a and 6b are schematic diagrams showing BLER and data throughput obtained by pilot signals mapped according to another embodiment of the present invention, respectively.
Figure 6B:
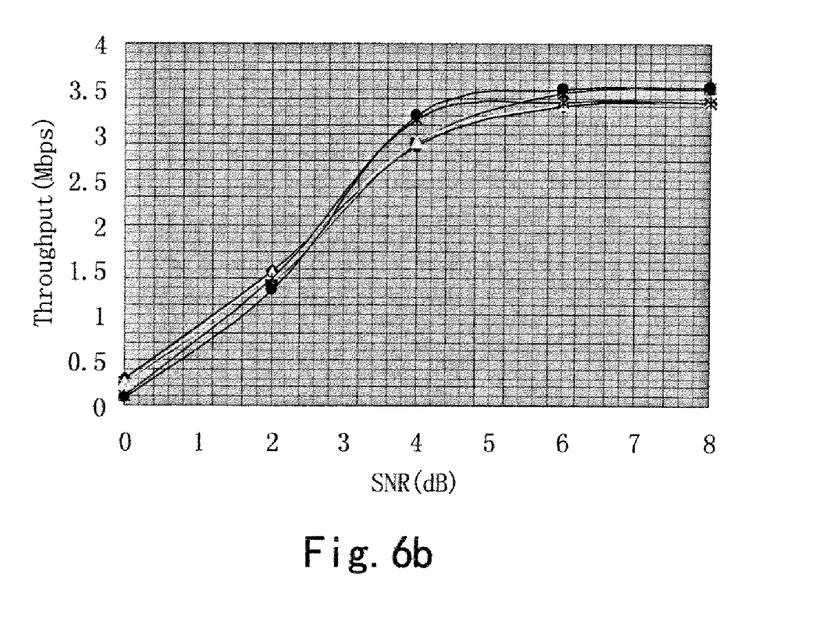
Figure 7A:
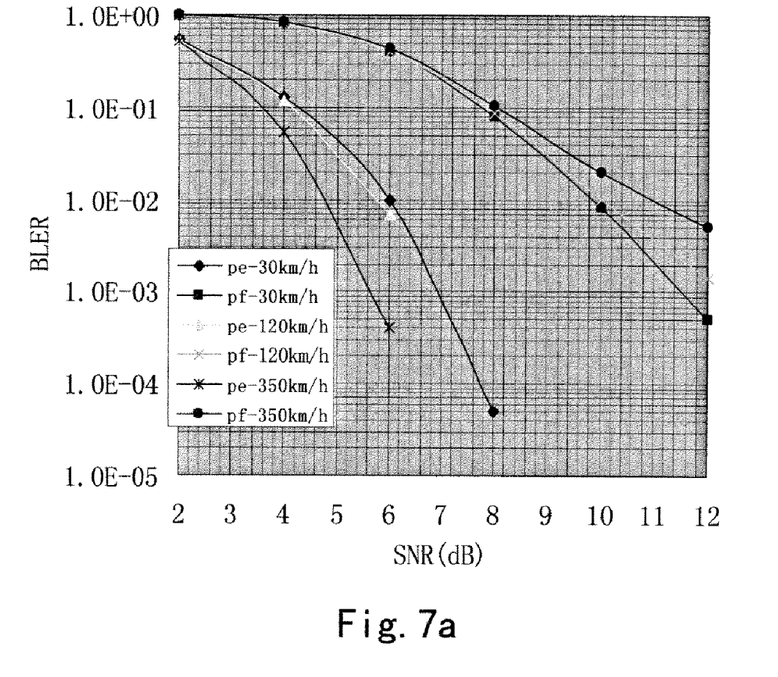
FIGS. 7a and 7b are schematic diagrams showing Block Error Rate (BLER) and data throughput obtained by pilot signals mapped according to a still further embodiment of the present invention, respectively.
Figure 7B:
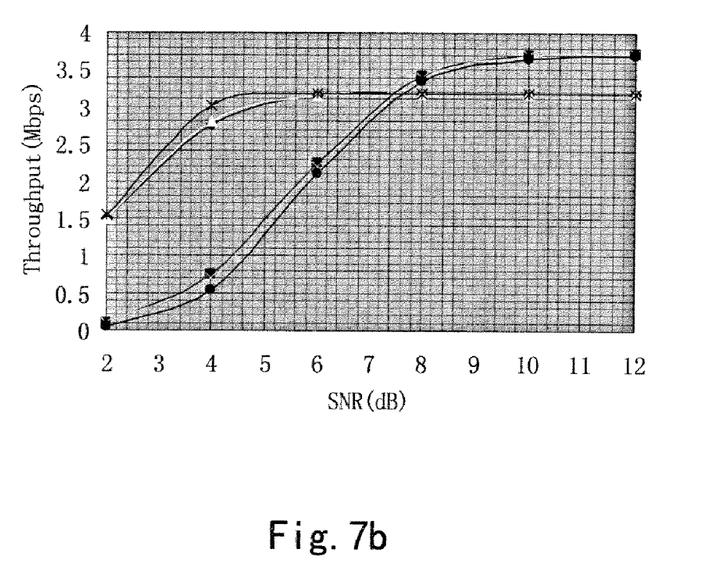

FIGS. 5-7 are schematic diagrams showing Block Error Rate (BLER) and data throughput of pilot signals mapped according to the embodiments of the present invention, respectively.

In the process of testing the BLER performance of the pilot signal template for E-MBMS, QPSK modulation is adopted with R=⅓, and turbo channel coding is utilized. MIMO (multiple input/multiple output) transmission scheme employs space division multiplexing technique with two branches, and in-vehicle speeds are 30 km/h, 120 km/h and 350 km/h.

FIGS. 5a and 5b shows performance curves of BLER and data throughput of pilot signal mapping templates of the first and second embodiments in the case that the control channel occupies one spacing. FIGS. 6a and 6b shows performance curves of BLER and data throughput of pilot signal mapping templates of the third and fourth embodiments in the case that the control channel occupies two spacings. FIGS. 7a and 7b shows performance curves of BLER and data throughput of pilot signal mapping templates of the fifth and sixth embodiments in the case that the control channel occupies three spacings.

As shown in FIGS. 5a and 5b, when user equipment (UE) is at respective speeds as described above, the BLER of the pilot signal mapping templates of the first and second embodiments increases with the UE's speed, and in particular gets better with a higher SNR (signal to noise ratio). For example, compared with the case of 30 km/h, the BLER of the two templates achieves a gain of about 0.36 dB or 0.2 dB, respectively, in the case of 120 km/h. The performance gain increases as the UE's speed increases. In addition, in terms of data throughput, the throughput of the pilot signal mapping template of the second embodiment reaches a gain of 0.121 Mbps on average with SNR=6 dB, and reaches a gain of 0.144 Mbps with SNR=8 dB.

As shown in FIGS. 6a and 6b, when user equipment (UE) is at respective speeds as described above, the BLER of the pilot signal mapping templates of the third and fourth embodiments increases with the UE's speed, and in particular gets better with a higher SNR. For example, compared with the case of 30 km/h, the BLER of the two templates achieves a gain of about 0.2 dB, respectively, in the case of 120 km/h. The performance gain increases as the UE's speed increases. In addition, in terms of data throughput, the throughput of the pilot signal mapping template of the fourth embodiment reaches a gain of 0.146 Mbps on average with SNR=6 dB, and reaches a gain of 0.158 Mbps with SNR=8 dB.

As shown in FIGS. 7a and 7b, when user equipment (UE) is at respective speeds as described above, the pilot signal mapping template of the sixth embodiment has a SNR loss greater than that of the fifth embodiment. The greater performance loss is due to larger pilot spacings in the frequency and time domains. The BLER increases with the UE's speed, and in particular gets better with a higher SNR. In addition, in terms of data throughput, the throughput of the pilot signal mapping template of the sixth embodiment reaches a gain of 0.525 Mbps on average with SNR=12 dB, compared with the fifth embodiment.

It should be noted that the present invention is not limited to the foregoing embodiments, but can be extended to other technical fields. The present invention can be considered in any design involving pilot signals, and the technical solutions of the present invention can be applied to other relevant product or method.

The present invention has been disclosed above with the preferred embodiments. Those skilled in the art can make various variations, replacements and additions to the present invention within the scope of the present invention. Therefore, the scope of the present invention is not limited to the above specific embodiments, but should be defined by the appended claims.

What is claimed is:

1. A method for mapping pilot symbols in a multiplexing mode of unicast service and Multimedia Broadcast/Multicast Service (MBMS), the method comprising:
generating pilot symbols for the unicast service and the MBMS service, respectively;
mapping the pilot symbols for the MBMS service to multiple transmit antennas such that, in a subframe, the pilot symbols for the MBMS service for the multiple antennas are arranged in a same time domain and the pilot symbols for different antennas are adjacent to each other in a frequency domain, the pilot symbols for the MBMS service for the same transmit antenna are spaced from each other by one subcarrier in the frequency domain and, the pilot symbols for the MBMS for different antennas are spaced from each other by four Orthogonal Frequency Division Multiplexing (OFDM) symbols in the time domain, and are arranged in a staggered form along the time domain, and
mapping the pilot symbols for the unicast service to different subcarriers in a same OFDM symbol such that, in a subframe, the pilot symbols for the unicast service for the different antennas are arranged in staggered form along the frequency domain, and spaced from each other by a same number of subcarriers, and all subcarriers of one OFDM symbol are assigned to a control channel for the unicast service; and
time division multiplexing the pilot symbols for the unicast and MBMS services, and transmitting them via the multiple transmit antennas.

2. The method according to claim 1, further comprising a step of inserting data symbols into subcarriers to which no pilot symbol is mapped within the subframe.

3. The method according to claim 1, wherein the number of the multiple transmit antennas is two.

4. The method of claim 1 comprising:
at the reception side, receiving the pilot signals, and performing channel estimations for the unicast and MBMS services, respectively, based on the received pilot signals.

5. A method for mapping pilot symbols in a multiplexing mode of unicast service and Multimedia Broadcast/Multicast Service (MBMS), the method comprising:
generating pilot symbols for the unicast service and the MBMS service, respectively;
mapping the pilot symbols for the MBMS service to multiple transmit antennas such that, in a subframe, the pilot symbols for the MBMS service for the multiple antennas are arranged in a same time domain and the pilot symbols for respective antennas are adjacent to each other in a frequency domain, the pilot symbols for the MBMS service for the same transmit antenna are spaced from each other by two subcarriers in the frequency domain and, the pilot symbol for the MBMS device for respective antennas are spaced from each other by two Orthogonal Frequency Division Multiplexing (OFDM) symbols in the time domain, and are arranged in a staggered form along the time domain, and
mapping the pilot symbols for the unicast service to different subcarriers in a same OFDM symbol, such that, in a subframe, the pilot symbols for the unicast service for respective antennas are arranged in staggered form along the frequency domain, and spaced from each other by a same number of subcarriers, and all subcarriers of said same OFDM symbol are assigned to a control channel for the unicast service; and
time division multiplexing the pilot symbols for the unicast and MBMS services, and transmitting them via the multiple transmit antennas.

6. The method according to claim 5, further comprising a step of inserting data symbols into subcarriers to which no pilot symbol is mapped within the subframe.

7. The method according to claim 5, wherein the number of the multiple transmit antennas is two.

8. The method of claim 5 comprising:
at the reception side, receiving the pilot signals, and performing channel estimations for the unicast and MBMS services, respectively, based on the received pilot signals.

9. A method for mapping pilot symbols in a multiplexing mode of unicast service and Multimedia Broadcast/Multicast Service (MBMS), the method comprising:
generating pilot symbols for the unicast service and the MBMS service, respectively;
mapping the pilot symbols for the MBMS service to multiple transmit antennas such that, in a subframe, the pilot symbols for the MBMS service for the multiple antennas are arranged in a same time domain and the pilot symbols for respective antennas are adjacent to each other in a frequency domain, the pilot symbols for the MBMS service for the same transmit antenna are spaced from each other by one subcarrier in the frequency domain and, the pilot symbols for the MBMS service for the respective antennas are spaced from each other by three Orthogonal Frequency Division Multiplexing (OFDM) symbols in the time domain, and are arranged in a staggered form along the time domain, and
mapping the pilot symbols for the unicast service to different subcarriers in a same OFDM symbol, such that, in a subframe, the pilot symbols for the unicast service for respective antennas are arranged in a staggered form along the frequency domain, and spaced from each other by a same number of subcarriers, and subcarriers of two OFDM symbols are assigned to a control channel for the unicast service; and
time division multiplexing the pilot symbols for the unicast and MBMS services, and transmitting them via the multiple transmit antennas.

10. The method according to claim 9, further comprising a step of inserting data symbols into subcarriers to which no pilot symbol is mapped within the subframe.

11. The method according to claim 9, wherein the number of the multiple transmit antennas is two.

12. The method of claim 9 comprising:
at the reception side, receiving the pilot signals, and performing channel estimations for the unicast and MBMS services, respectively, based on the received pilot signals.

13. A method for mapping pilot symbols in a multiplexing mode of unicast service and Multimedia Broadcast/Multicast Service (MBMS), the method comprising:
generating pilot symbols for the unicast service and the MBMS service, respectively;

mapping the pilot symbols for the MBMS service to multiple transmit antennas such that, in a subframe, the pilot symbols for the MBMS service for the multiple antennas are arranged in a same time domain and the pilot symbols for respective antennas are adjacent to each other in a frequency domain, the pilot symbols for the MBMS service for the same transmit antenna are spaced from each other by two subcarriers in the frequency domain and the pilot symbols for the MBMS service for respective antennas are spaced from each other by two Orthogonal Frequency Division Multiplexing (OFDM) symbols in the time domain, and are arranged in a staggered form along the time domain, and mapping the pilot symbols for the unicast service to different subcarriers in a same OFDM symbol, such that, in a subframe, the pilot symbols for the unicast service for respective antennas are arranged in a staggered form along the frequency domain, and spaced from each other by a same number of subcarriers and subcarriers of two OFDM symbols are assigned to the control channel for the unicast service; and time division multiplexing the pilot symbols for the unicast and MBMS services, and transmitting them via the multiple transmit antennas.

14. The method according to claim 13, further comprising a step of inserting data symbols into subcarriers to which no pilot symbol is mapped within the subframe.

15. The method according to claim 13, wherein the number of the multiple transmit antennas is two.

16. The method of claim 13 comprising:
at the reception side, receiving the pilot signals, and performing channel estimations for the unicast and MBMS services, respectively, based on the received pilot signals.

17. A method for mapping pilot symbols in a multiplexing mode of unicast service and Multimedia Broadcast/Multicast Service (MBMS), the method comprising:
generating pilot symbols for the unicast service and the MBMS service, respectively;
mapping the pilot symbols for the MBMS service to multiple transmit antennas such that, in a subframe, the pilot symbols for the MBMS service for the multiple antennas are arranged in a same time domain and the pilot symbols for respective antennas are adjacent to each other in a frequency domain, the pilot symbols for the MBMS service for the same transmit antenna are spaced from each other by one subcarrier in the frequency domain and, the pilot symbols for the MBMS service for respective antennas are spaced from each other by three Orthogonal Frequency Division Multiplexing (OFDM) symbols in the time domain, and are arranged in a staggered form along the time domain, and
mapping the pilot symbols for the unicast service to different subcarriers in a same OFDM symbol, such that, in a subframe, the pilot symbols for the unicast service for respective antennas are arranged in a staggered form along the frequency domain, and spaced from each other by a same number of subcarriers and subcarriers of three OFDM symbols are assigned to a control channel for the unicast service; and
time division multiplexing the pilot symbols for the unicast and MBMS services, and transmitting them via the multiple transmit antennas.

18. The method according to claim 17, further comprising a step of inserting data symbols into subcarriers to which no pilot symbol is mapped within the subframe.

19. The method according to claim 17, wherein the number of the multiple transmit antennas is two.

20. The method of claim 17 comprising:
at the reception side, receiving the pilot signals, and performing channel estimations for the unicast and MBMS services, respectively, based on the received pilot signals.

21. A method for mapping pilot symbols in a multiplexing mode of unicast service and Multimedia Broadcast/Multicast Service (MBMS), the method comprising:
generating pilot symbols for the unicast service and the MBMS service, respectively;
mapping the pilot symbols for the MBMS service to multiple transmit antennas such that, in a subframe, the pilot symbols for the MBMS service for the multiple antennas are arranged in a same time domain and the pilot symbols for respective antennas are adjacent to each other in a frequency domain, the pilot symbols for the MBMS service for the same transmit antenna are spaced from each other by two subcarriers in the frequency domain and the pilot symbols for the MBMS service for respective antennas are spaced from each other by three Orthogonal Frequency Division Multiplexing (OFDM) symbols in the time domain, and are arranged in a staggered form along the time domain, and
mapping the pilot symbols for the unicast service to different subcarriers in a same OFDM symbol, such that in a subframe, the pilot symbols for the unicast service for respective antennas are arranged in a staggered form along the frequency domain, and spaced from each other by a same number of subcarriers and subcarriers of three OFDM symbols are assigned to the control channel for the unicast service; and
time division multiplexing the pilot symbols for the unicast and MBMS services, and transmitting them via the multiple transmit antennas.

22. The method according to claim 21, further comprising a step of inserting data symbols into subcarriers to which no pilot symbol is mapped within the subframe.

23. The method according to claim 21, wherein the number of the multiple transmit antennas is two.

24. The method of claim 21 comprising:
at the reception side, receiving the pilot signals, and performing channel estimations for the unicast and MBMS services, respectively, based on the received pilot signals.

25. An apparatus for mapping pilot symbols in a multiplexing mode of unicast service and Multimedia Broadcast/Multicast Service (MBMS), the apparatus comprising:
a pilot symbol generator for generating pilot symbols for the unicast service and the MBMS service;
a unicast pilot symbol template generator for mapping, to multiple transmit antennas, pilot symbols for channel estimation of unicast service, based on the pilot symbols provided from the pilot symbol generator;
a MBMS pilot symbol template generator for mapping, based on the pilot symbols provided from the pilot symbol generator, pilot symbols for the MBMS service to the multiple transmit antennas such that, in a subframe, the pilot symbols for the MBMS service for the multiple antennas are arranged in a same time domain and the pilot symbols for respective antennas are adjacent to each other in a frequency domain, the pilot symbols for the MBMS service for the same transmit antenna are spaced from each other by a predetermined number of subcarriers in the frequency domain and the pilot symbols for the MBMS service for respective antennas are spaced from each other by a predetermined number of Orthogonal Frequency Division Multiplexing (OFDM) symbols in the time domain, and are arranged in a staggered form along the time domain, and for mapping the pilot symbols for the unicast service to different subcarriers in a same OFDM symbol, such that, in a subframe, the pilot symbols for the unicast service for respective antennas are arranged in a staggered form along the frequency domain, and spaced from each other by a same number of subcarriers; and a pilot signal synthesizer for time division multiplexing the pilot symbols for the unicast and MBMS services.

26. The apparatus according to claim 25, wherein subcarriers of at least one OFDM symbol or at most three OFDM symbols are assigned to a control channel of said unicast service.

27. The apparatus according to claim 25, further comprising a data symbol generator for generating data symbols, wherein the data symbols are inserted into subcarriers to which no pilot symbol is mapped within the subframe.

* * * * *